United States Patent
Kaku et al.

(12)

(10) Patent No.: US 6,427,100 B1
(45) Date of Patent: Jul. 30, 2002

(54) MOTOR CONTROL APPARATUS FOR HYBRID VEHICLE

(75) Inventors: Toshiaki Kaku; Takashi Kamimura, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/686,901

(22) Filed: Oct. 12, 2000

(30) Foreign Application Priority Data

Oct. 13, 1999 (JP) .......................................... 11-291699

(51) Int. Cl.[7] ................................................ B60L 11/02
(52) U.S. Cl. ........................ 701/22; 180/65.3; 318/139
(58) Field of Search ........................... 701/22; 180/65.1, 180/65.2, 65.3, 65.8, 65.4; 318/139, 254; 361/28

(56) References Cited

U.S. PATENT DOCUMENTS

| | | | | |
|---|---|---|---|---|
| 5,461,531 A | * | 10/1995 | Tuchiya et al. ................ 361/28 |
| 5,469,032 A | * | 11/1995 | Otake .......................... 318/254 |
| 5,485,375 A | * | 1/1996 | Tamaki et al. ............... 180/65.8 |
| 5,661,380 A | * | 8/1997 | Obara et al. ................. 318/139 |
| 5,697,466 A | * | 12/1997 | Moroto et al. .............. 180/65.2 |
| 5,730,238 A | * | 3/1998 | Tamaki et al. ............... 180/65.8 |
| 6,131,057 A | * | 10/2000 | Tamaki et al. ............. 180/65.1 |
| 6,276,472 B1 | * | 8/2001 | Takashima et al. ..... 123/179.16 |

* cited by examiner

Primary Examiner—Gary Chin
(74) Attorney, Agent, or Firm—Arent Fox Kintner Plotkin & Kahn, PLLC

(57) ABSTRACT

Disclosed is a motor control apparatus which can detect an abnormality in a feedback control loop and can suppress a change in the behavior of a vehicle that does not meet a driver's demand when the abnormality occurs. A motor control apparatus for a hybrid vehicle with an engine for outputting driving force of the vehicle, a motor for generating driving force for assisting the output from the engine and a battery for supplying power to the motor and for storing electric energy regenerated by the motor acting as a generator when the driving force is not required, is provided with: a detector for detecting supplied power to the motor or supplied current to the motor; a feedback controller for performing feedback control to keep the supplied power or the supplied current at a target value based on the detection result from the detector; an abnormality detector for detecting an abnormality in the detector; and an abnormality processing device for fixing supplied power or supplied current to the motor to a predetermined value by reducing a gain in the feedback control or stopping the feedback control until a predetermined time elapses since detection of an abnormality in the detector, and stopping controlling the motor after the predetermined time elapses since detection of the abnormality.

4 Claims, 4 Drawing Sheets

MOTOR CONTROL APPARATUS FOR HYBRID VEHICLE

BACKGROUND OF THE INVENTION

1. Field of the Invention

The present invention relates to a motor control apparatus for controlling a motor which is mounted in a hybrid vehicle.

This application is based on Japanese Patent Application, Unpublished, No. Hei 11-291699, the contents of which are incorporated herein by reference.

2. Description of the Related Art

There are known hybrid vehicles, each of which has a motor in addition to an engine as a power source for driving the vehicle. Hybrid vehicles are classified into series hybrid vehicles and parallel hybrid vehicles.

In a series hybrid vehicle, the motor is driven by power output or the like from a generator which is driven by an engine, and the wheels are driven by means of the motor. As the engine is not mechanically coupled to the wheels in the series hybrid vehicle, the engine can run at approximately a constant speed in a speed range with high fuel consumption rate and low emissions, thus ensuring higher fuel consumption rate and lower emissions than conventional engine vehicles.

By contrast, a parallel hybrid vehicle uses a motor coupled to an engine to assist driving of the drive shaft of the engine and has a power storage unit which is charged by electric energy that is acquired by using this motor as a generator. This generated electric energy is also used by electrical equipment in the vehicle. A parallel hybrid vehicle can therefore reduce the operational load of the engine and can also ensure a higher fuel consumption rate and lower emission than a conventional engine vehicle.

There are several types of parallel hybrid vehicles. In one type of parallel hybrid vehicle, the motor is directly coupled to the output shaft of the engine to assist the engine output and serves as a generator at the time of deceleration, generating electric energy which is stored in a battery or the like. In another type of parallel hybrid vehicle, either one of the engine and the motor or both can generate driving force and a generator is provided separately.

Such hybrid vehicles are designed to execute various operations, such as assisting the engine output by using the motor, for example, at the time of acceleration and charging the battery or the like by deceleration regeneration at the time of deceleration, to thereby secure electric energy of the battery. The secured electric energy can allow the hybrid vehicles to meet with drivers' demands.

The motor that is used in a hybrid vehicle assists the engine output and performs deceleration regeneration in accordance with the running conditions of the vehicle. The output control for such operations is often accomplished by feedback control on demanded power or demanded current.

If some sort of abnormality occurs in the control loop that executes feedback control, however, the feedback control is carried out based on this abnormal output value. This may lead to a change in the behavior of the vehicle that does not meet a driver's demand.

SUMMARY OF THE INVENTION

Accordingly, it is an object of the present invention to provide a motor control apparatus for a hybrid vehicle, which can detect an abnormality in the control loop and can suppress a change in the behavior of the vehicle that does not meet a driver's demand when the abnormality occurs.

In the first aspect of the present invention, a motor control apparatus (for example, a motor control apparatus 5 in the embodiment) for a hybrid vehicle with an engine (an engine 1) for outputting driving force of the vehicle, a motor (a motor 2) for generating driving force for assisting the output from the engine and a battery (a battery 3) for supplying power to the motor and for storing electric energy regenerated by the motor acting as a generator when the driving force is not required, comprising: a detector (a sensor 12, current sensors 13,15 and 17, voltage sensors 14 and 16) for detecting supplied power to the motor or supplied current to the motor; a feedback controller (a demanded power computing section 51, a real power computing section 52, and a feedback control section 53) for performing feedback control to keep the supplied power or the supplied current at a target value based on the detection result from the detector; an abnormality detector (an abnormality detecting section 54) for detecting an abnormality in the detector; and an abnormality processing device (an abnormality processing section 55) for fixing supplied power or supplied current to the motor to a predetermined value by reducing a gain in the feedback control or stopping the feedback control until a predetermined time elapses since detection of an abnormality in the detector, and stopping controlling the motor after the predetermined time elapses since detection of the abnormality.

The structure according to the first aspect of the present invention does not permit feedback control to be executed based on a feedback control loop where an abnormality has occurred, and can thus prevent the occurrence of a change in the behavior of the vehicle that does not meet a driver's demand.

In the second aspect of the present invention, the abnormality processing device restricts a speed of the engine in such a way that a counter electromotive force generated by the motor when control on the motor is stopped does not exceed a predetermined value (step S8).

The structure according to the second aspect of the present invention limits the engine speed in such a way that when motor control is stopped, the counter electromotive force generated by the motor does not exceed a predetermined value. This provides an advantage of preventing the counter electromotive force generated by the motor coupled to the engine from going high and over the allowable voltage for a power drive unit or the like.

In the third aspect of the present invention, the detector includes sensors (current sensors 15 and 17, voltage sensors 14 and 16), provided on both battery and motor sides, for detecting the supplied power or the supplied current; and the abnormality detector detects the abnormality based on a difference between output values of the sensors.

The structure according to the third aspect of the present invention compares the output values of a plurality of sensors with one another so as to be able to detect such a phenomenon that the output value of one sensor is fixed to a certain value although it is not higher than the upper limit or lower than the lower limit.

DETAILED DESCRIPTION OF THE PREFERRED EMBODIMENTS

A hybrid vehicle according to one embodiment of the present invention will now be described with reference to the accompanying drawings.

Figure 1:
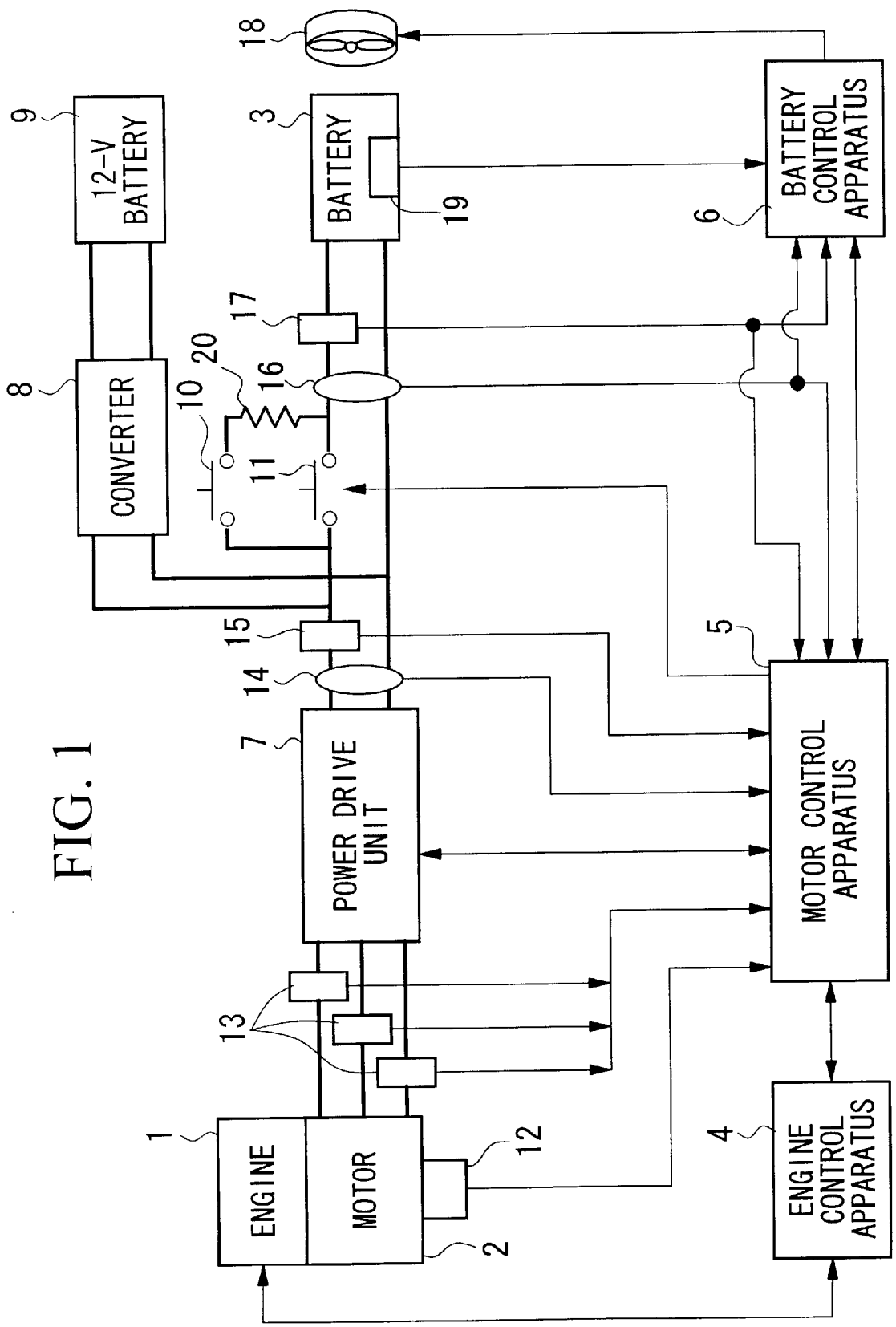
FIG. 1 is a block diagram illustrating the structure of a hybrid vehicle.

FIG. 1 is a block diagram illustrating the general structure of a parallel hybrid vehicle which is one type of hybrid vehicle according to one embodiment of the present invention. In FIG. 1, reference numeral "1" denotes an engine which is operated by the energy generated by fuel combustion, and reference numeral "2" denotes a motor which is used together with the engine 1 and is operated by electric energy. The driving forces of both the engine 1 and motor 2 are transmitted to drive wheels (not shown) via a transmission (not shown) which comprises an automatic transmission and a manual transmission. When the hybrid vehicle decelerates, the driving force is transmitted to the motor 2 from the drive wheels and the motor 2 serves as a generator to collect the kinetic energy of the vehicle's body as electric energy.

Reference numeral "3" is a battery which supplies power to the motor 2 and stores the electric energy that is generated as the motor 2 serves as a generator when no driving force is needed. The battery 3 is designed as a high-voltage battery which has plural modules connected in series, each having a plurality of cells connected in series. A temperature sensor 19 is attached to the modules that constitute the battery 3.

Reference numeral "4" denotes an engine control apparatus which monitors the degree of accelerator opening, the engine speed, the vehicle speed and so forth every predetermined time using unillustrated individual sensors, and determines a motor regeneration mode, assistance mode, deceleration mode or the like from the monitoring results. The engine control apparatus 4 also determines the assistance/regeneration amount in association with the mode and sends information about the mode and the assistance/regeneration amount to a motor control apparatus 5. Upon reception of such information from the engine control apparatus 4, the motor control apparatus 5 controls a power drive unit 7 or the like which drives or regenerates the motor 2 as instructed by this information. Reference numeral "6" is a battery control apparatus 6 which computes the remaining battery charge (state of charge) of the battery 3. To protect the battery 3, the battery control apparatus 6 also controls a cooling fan 18, which is provided on a battery box that houses the battery 3, in such a manner that the temperature of the battery 3 becomes equal to or lower than a predetermined value.

The engine control apparatus 4, motor control apparatus 5 and battery control apparatus 6 are constituted by a CPU (Central Processing Unit) and a memory, and their functions are achieved by running a program which accomplishes the functions.

The power drive unit 7 has three series parallel switching circuits, each having two switching elements (not shown) connected in series. The switching elements in the power drive unit 7 are set on or off by the motor control apparatus 5, causing the high-voltage DC component supplied to the power drive unit 7 from the battery 3 to be supplied to the motor 2 via three-phase lines.

Reference numeral "9" denotes a 12-V battery for driving various kinds of ancillaries. The 12-V battery 9 is connected to the battery 3 via a converter 8. The converter 8 drops the voltage from the battery 3 and supplies the dropped voltage to the 12-V battery 9.

The battery 3 is connected to the power drive unit 7 via a precharge contactor 10 and a main contactor 11. The ON/OFF control of the precharge contactor 10 and main contactor 11 is executed by the motor control apparatus 5.

Reference numeral "12" is a sensor which detects the position and the number of rotations of a rotary shaft of the motor 2, and reference numeral "13" denotes current sensors which detect the currents that flow in the three-phase lines. The detected values of the sensor 12 and the current sensors 13 are input to the motor control apparatus 5.

Reference numeral "14" is a voltage sensor which detects a voltage at the input section of the power drive unit 7, and reference numeral "15" is a current sensor which detects the current that is input to the power drive unit 7. Reference numeral "16" is a voltage sensor which detects voltage on the battery (3) side. The voltage values detected by the voltage sensors 14 and 16 and the current value detected by the current sensor 15 are input to the motor control apparatus 5. Reference numeral "17" is a current sensor for the battery 3, which detects the current that flows in the battery 3 through the contactors. The current value detected by this current sensor 17 is input to the battery control apparatus 6.

As mentioned above, the precharge contactor 10 and the main contactor 11 are interposed between a pair of the voltage sensor 16 and the current sensor 17 and a pair of the voltage sensor 14 and the current sensor 15. The voltage sensor 16 and the current sensor 17 detect the voltage across and current from the battery 3, while the voltage sensor 14 and the current sensor 15 detect the voltage across and current from the power drive unit 7. The current that is detected by the current sensor 15 is the current flowing in the converter 8 subtracted from the current from the power drive unit 7.

The operation of the hybrid vehicle with the above-described structure will now be briefly described.

First, the battery control apparatus 6 computes the remaining battery charge of the battery 3 from the detected values, such as the input/output current and voltage and the temperature, and sends the computed value to the motor control apparatus 5. The motor control apparatus 5 sends the received remaining battery charge to the engine control apparatus 4.

The engine control apparatus 4 determines the mode (assistance, regeneration, starting, deceleration or the like) and the needed torque in the motor 2 from the remaining battery charge, the engine speed, the degree of throttle opening (e.g., the extent of the throttle opening), the engine torque, the real torque of the motor 2 and so forth, and sends information on the mode and the demanded torque to the motor control apparatus 5.

When receiving the information on the mode and the demanded torque from the engine control apparatus 4, the motor control apparatus 5 performs feedback control in the assistance mode or the deceleration mode in such a way that the power on the input side of the power drive unit 7 (on the side of the voltage sensor 14 and the current sensor 15 in FIG. 1) becomes the power according to the demanded torque received from the motor control apparatus 5. In the cruise mode, the motor control apparatus 5 performs feedback control in such a way that the power value of the battery 3 (on the side of the voltage sensor 16 and the current sensor 17 in FIG. 1) becomes the demanded power. When powers are computed this way, the motor control apparatus 5 controls the power drive unit 7 in accordance with the computed powers.

The engine control apparatus 4, the motor control apparatus 5, and the battery control apparatus 6 execute the above-described processes at a predetermined timing whenever necessary to control the engine 1, the motor 2, and the battery 3 and drive the hybrid vehicle.

Figure 2:
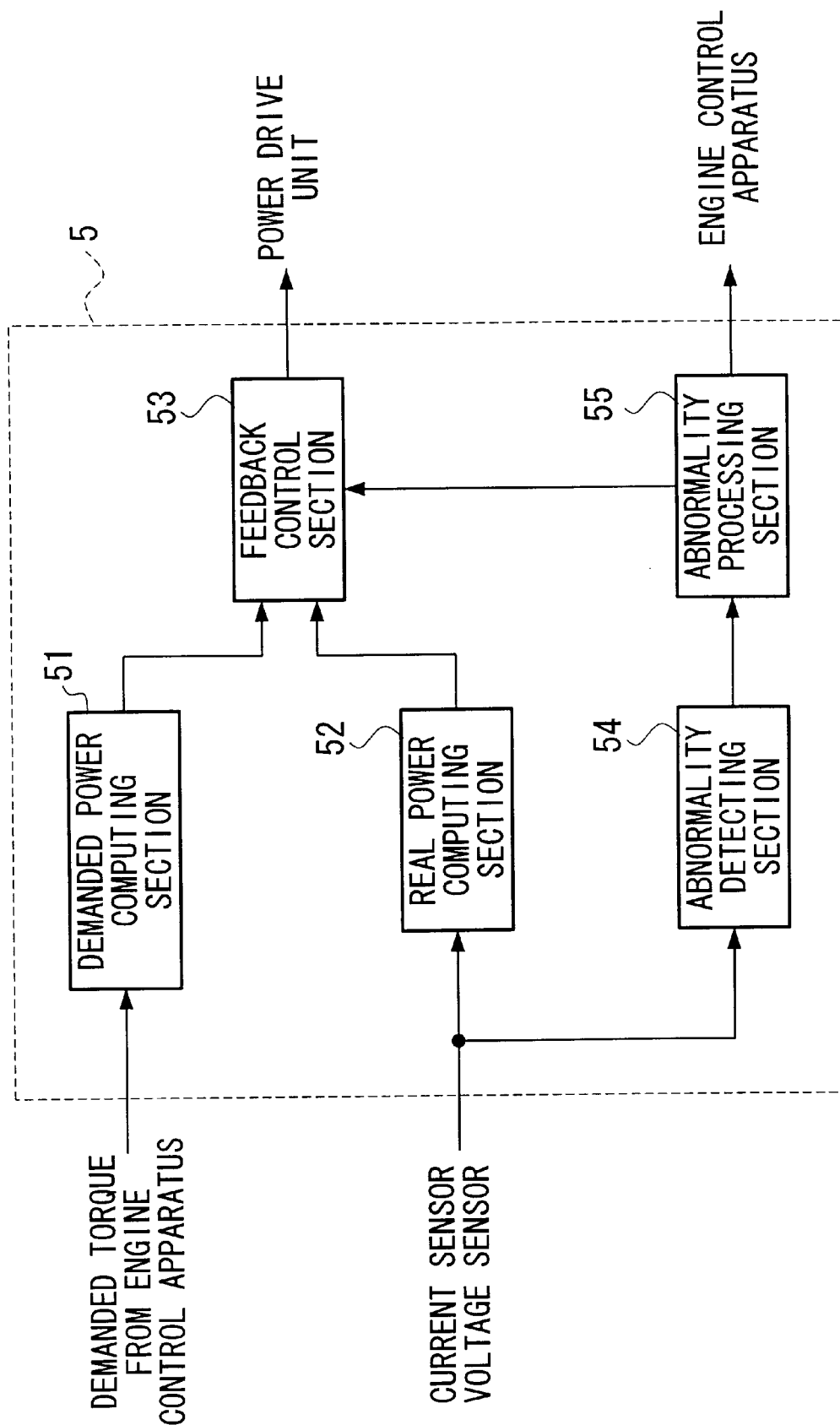
FIG. 2 is a block diagram showing the structure of a motor control apparatus 5 shown in FIG. 1.

Referring now to FIG. 2, a description will be given of the structure which detects an abnormality in the control loop in the motor control apparatus 5 shown in FIG. 1 and suppresses a change in the behavior of the vehicle that does not meet a driver's demand when such an abnormality occurs. Referring to FIG. 2, a demanded power computing section 51 computes demanded power that should be supplied to the motor 2, based on the demanded torque specified by the engine control apparatus 4. A real power computing section 52 computes the power that is currently supplied to the motor 2 (hereinafter referred to as "real power") from the output values of the current sensor 15 and the voltage sensor 14. A feedback control section 53 acquires the deviation between the demanded power and the real power, determines the power to be supplied to the motor 2 based on this deviation and performs feedback control based on the determined power. An abnormality detecting section 54 detects abnormal output values of the current sensors and the voltage sensors. An abnormality processing section 55 instructs the feedback control section 53 to perform a process in an abnormal mode and instructs the engine control apparatus 4 to lower the upper limit of the engine speed of the engine 1, based on the detection result from the abnormality detecting section 54.

Figure 4:
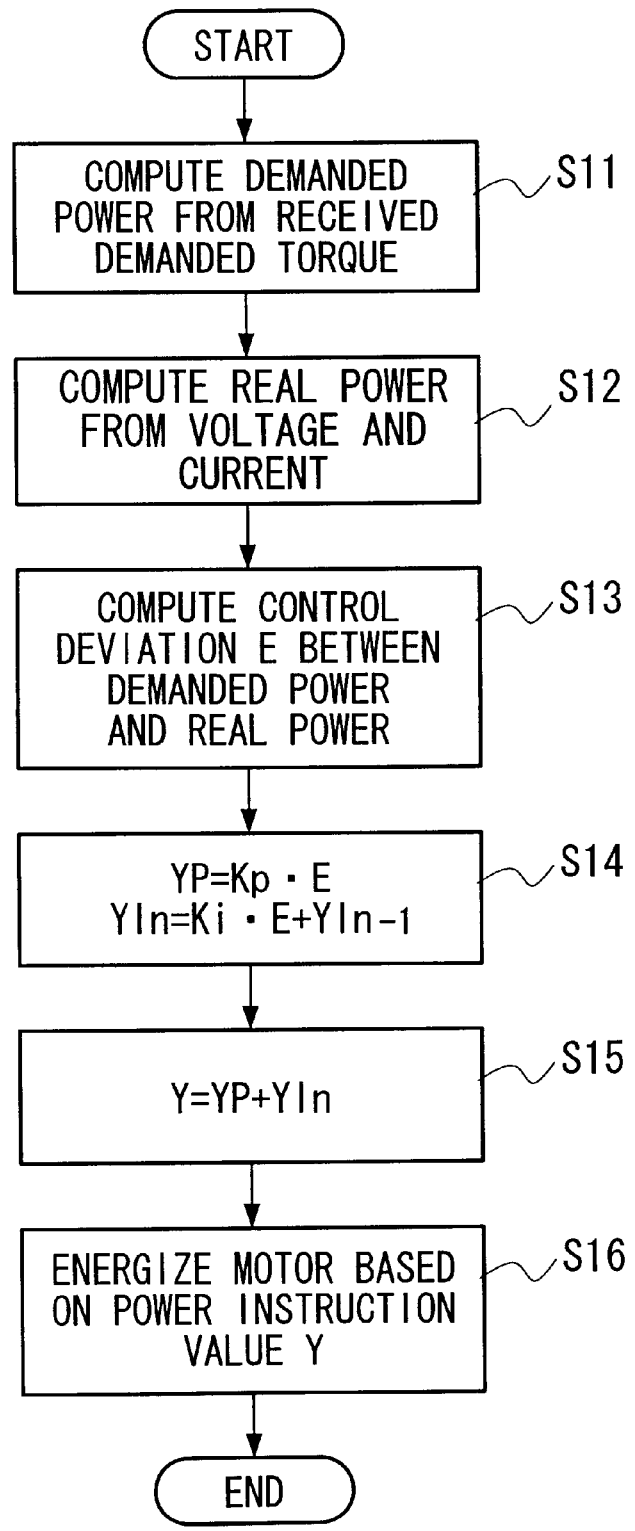
FIG. 4 is a flowchart illustrating the operations of a power demand computing section 51, real power computing section 52 and feedback control section 53 shown in FIG. 2.

The operations of the demanded power computing section 51, the real power computing section 52 and the feedback control section 53 will be described referring to FIGS. 2 and 4. FIG. 4 is a flowchart illustrating the operations of the demanded power computing section 51, the real power computing section 52, and the feedback control section 53 in the case where the output of the engine 1 is assisted by the motor 2.

First, the demanded power computing section 51 computes the power to be supplied to the motor 2 (demanded power) in accordance with the demanded torque specified by the engine control apparatus 4 (step S11). This demanded power is computed from the demanded torque by referring to a demanded power conversion map (not shown) in which power is defined in association with the torque. The computed demanded power becomes a target value in the feedback control.

Next, the real power computing section 52 receives the output value of the voltage sensor 14 and the output value of the current sensor 15, multiplies those values by each other to computer power, and computes real power by multiplying the computed power by the efficiency of the power drive unit 7 (step S12). This real power is the power that is actually supplied to the motor 2.

Then, the feedback control section 53 computes a power deviation (called "control deviation E") from the previously computed demanded power and real power (step S13). The control deviation E is computed by subtracting the real power from the demanded power.

Next, the feedback control section 53 computes a power instruction value Y. First, the feedback control section 53 computes a proportional operation component YP of the power instruction value Y and an integral operation component YIn of the power instruction value Y (step S14). The proportional operation component YP and integral operation component YIn are computed respectively from the following equations 1 and 2.

$$YP = Kp \cdot E \quad (1)$$

$$YIn = Ki \cdot E + YIn-1 \quad (2)$$

where Kp is the gain of the proportional operation component and Ki is the gain of the integral operation component both of which are determined in consideration of the response performance and stability of the motor 2 to be controlled. Note that n is the number of times the routine illustrated in FIG. 4 is performed, so that the integral operation component YIn is acquired by adding previously computed YIn−1 to Ki·E.

Then, the feedback control section 53 adds the proportional operation component YP and the integral operation component YIn computed in step S14, thus computing the power instruction value Y (step S15). The computed power instruction value Y is notified to the power drive unit 7 which energizes the motor 2 based on the power instruction value Y (step S16). As this routine is repeatedly executed, feedback control on the rotation of the motor 2 is accomplished.

Although the power instruction value Y is computed by adding the proportional operation component YP and the integral operation component YIn in the routine shown in FIG. 4, the power instruction value Y may be computed from either the proportional operation component YP or the integral operation component YIn alone. Further, a differential operation component may be used in addition to the proportional operation component and the integral operation component so that the power instruction value Y is computed through the normal PID operation and feedback control is executed in accordance with this power instruction value Y.

Although the feedback control shown in FIG. 4 is an example of power-based feedback control, current-based feedback control may also be feasible. In this case, the currents that flow through the respective phases (UVW) of the motor 2 should be detected by the three current sensors 13, a current instruction value which causes the current values to become a target value (demanded current value) should be acquired so that feedback control is executed based on this current instruction value. Further, feedback control may be executed based on a power instruction value or a current instruction value computed based on the position and the number of rotations of a rotary shaft of the motor 2 which are obtained by the sensor 12 shown in FIG. 1, not based on the supplied power or supplied current. Abnormality detection in those cases should be performed using the sensor 12 or the current sensor 13 in the same manner as done using the current sensor 15 or the current sensor 17.

Figure 3:
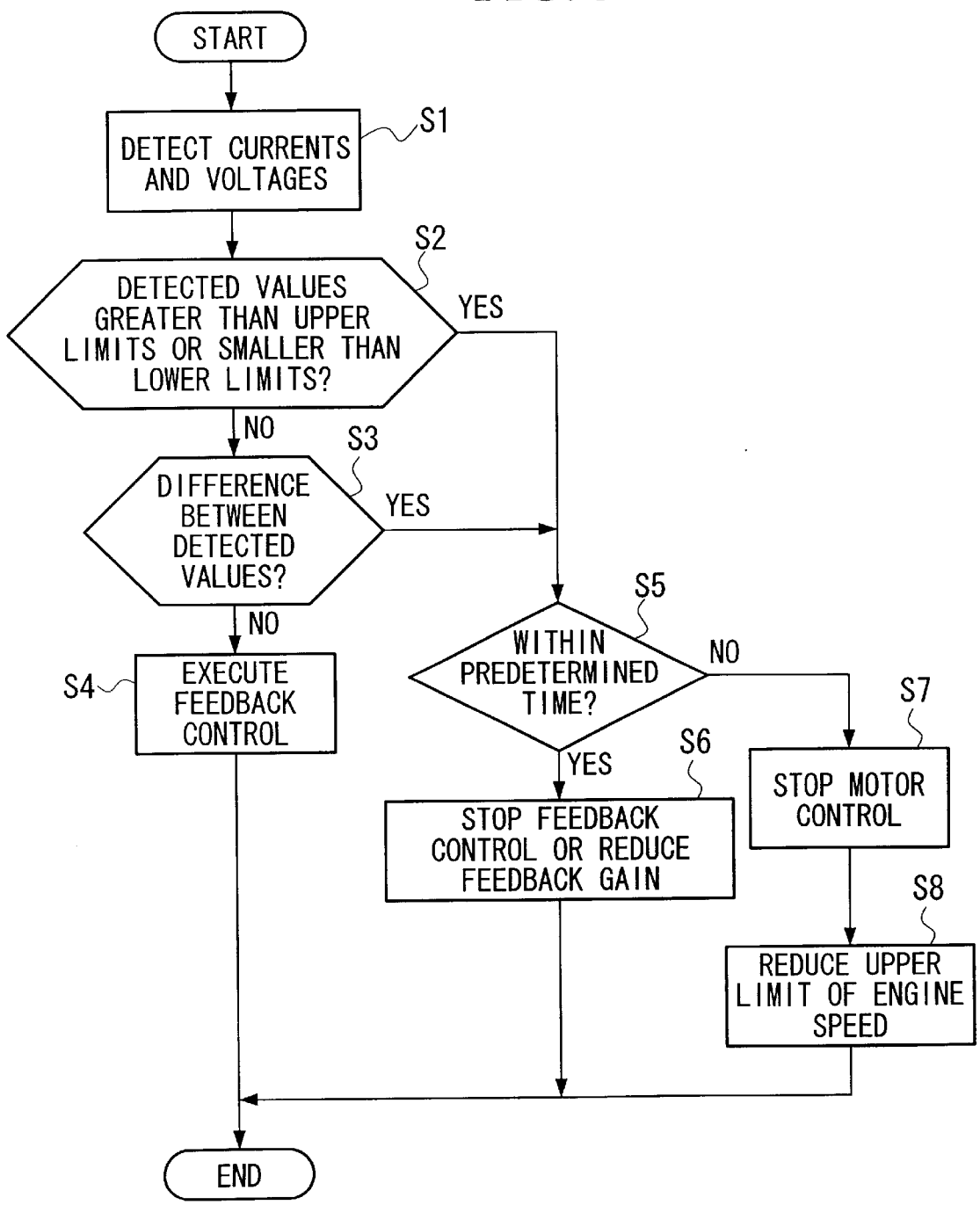
FIG. 3 is a flowchart illustrating the operations of an abnormality detecting section 54 and abnormality processing section 55 shown in FIG. 2.

Referring now to FIGS. 2 and 3, a description will be given of the operation of the abnormality detecting section 54 shown in FIG. 2 to detect an abnormality and the operation of the abnormality processing section 55 to execute a process when an abnormality occurs. FIG. 3 is a flowchart illustrating the operations of the abnormality detecting section 54 and abnormality processing section 55. The following will discuss the operation for the abnormality detection and abnormality process when power-based feedback control is carried out.

First, the abnormality detecting section 54 reads the output values of the current sensors 15 and 17, and the voltage sensors 14 and 16 (step S1). Subsequently, the abnormality detecting section 54 determines if the read values exceed their respective predetermined upper limits or go below their respective predetermined lower limits (step S2).

This decision is carried out as follows. The voltages of the signals that are output from the current sensors 15 and 17 are in the range of 0 to 5 V. Of this range, the range of 0.5 to 4.5 V is assigned to the detected current values, 0.5 V being the lower limit while 4.5 V is the upper limit. When the output of the current sensor 15 or 17 falls within the range of 0 to 0.5 V or the range of 4.5 to 5 V, the abnormality detecting section 54 determines that an abnormality has occurred in the current sensor 15 and/or 17. With regard to the voltages of the signals that are output from the voltage sensors 14 and 16, like those of the current sensors 15 and 17, the range of 0.5 to 4.5 V is assigned to the detected voltage values. When the output of the voltage sensor 14 or 16 falls within the range of 0 to 0.5 V or the range of 4.5 to 5 V, therefore, the abnormality detecting section 54 determines that an abnormality has occurred in the voltage sensor 14 and/or 16. When it is determined that an abnormality has occurred in any current sensor or any voltage sensor, the abnormality detecting section 54 informs the abnormality processing section 55 of the occurrence of an abnormality and proceeds to step S5.

When the values of the sensor outputs are not greater than the upper limits or not smaller than the lower limits in step S2, the abnormality detecting section 54 determines if there is a difference between the output values of the current sensors or there is a difference between the output values of the voltage sensors (step S3). This decision is made by checking first if the absolute value of the difference between the output value of the voltage sensor 14 and the output value of the voltage sensor 16 exceeds a predetermined value. The predetermined value here is determined in consideration of the detection error of the two voltage sensors. Because the two voltage sensors should normally output the same value, the difference between the output values of the two voltage sensors being greater than the detection error indicates that the output value of one of the voltage sensors is abnormal.

The abnormality detecting section 54 also determines if the absolute value of the difference between the output value of the current sensor 15 and the output value of the current sensor 17 is greater than the maximum value of the amount used by the converter 8. If the converter 8 were not connected, the two current sensors 15 and 17 should normally have outputs which are the same value, so that the difference between the output values of the two current sensors should not exceed the amount used by the converter 8. Therefore, the difference between the output values of the two current sensors being greater than the amount used by the converter 8 indicates that the output value of one of the current sensors is abnormal. By comparing the output values of the two sensors of each type with each other, it is possible to detect such a phenomenon that the output value of one sensor is fixed to a certain value although it is not higher than the upper limit or lower than the lower limit.

When it is determined from the result of the decision in step S3 that an abnormality has occurred in any of the current sensors or the voltage sensors, the abnormality detecting section 54 informs the abnormality processing section 55 of the occurrence of an abnormality and proceeds to step S5. When there is no difference between the output values of the current sensors and no difference between the output values of the voltage sensors in step S3, the abnormality detecting section 54 instructs the feedback control section 53 to determine the power instruction value Y and control the motor 2 through the normal process (step S4). The "normal process" means the process of the feedback control illustrated in FIG. 4.

When it is determined in step S2 or step S3 that an abnormality has occurred, the abnormality detecting section 54 measures the time elapsed since the occurrence of the abnormality and determines if this elapsed time lies within a predetermined time (step S5). The "predetermined time" is 2 to 3 seconds. When it is determined that this elapsed time is within the predetermined time, the abnormality processing section 55 instructs the feedback control section 53 to reduce the gain in feedback control mode (step S6). The reduction of the gain in feedback control mode means making the gain Kp of the proportional operation component and the gain Ki of the integral operation component smaller than the gains set at the normal time in the feedback control process shown in FIG. 4. As reducing the gains Kp and Ki slows the response, it is possible to prevent a change in the behavior of a vehicle that does not meet a driver's demand.

The gain lowering process may be carried out to reduce only one of the gain Kp of the proportional operation component and the gain Ki of the integral operation component.

Instead of lowering the gains in feedback control mode in step S6, feedback control may be stopped and open-loop control may be executed in accordance with the demanded power specified by the engine control apparatus 4. As the control is shifted to the open loop control without computing the power instruction value Y according to the output values of the current sensors or the voltage sensors so as to avoid feedback control based on the output of the sensor where an abnormality has occurred, it is possible to prevent a change in the behavior of a vehicle that does not meet a driver's demand.

When the time elapsed since the occurrence of an abnormality exceeds the predetermined time in step S5, on the other hand, the abnormality processing section 55 determines that the feedback control loop including the individual sensors is likely to have a failure and instructs the feedback control section 53 to stop control on the motor 2 (step S7). In response to this instruction, the feedback control section 53 stops controlling the motor 2. As a result, the control on the motor 2 is stopped so that the vehicle runs only on the power from the engine 1.

Next, the abnormality processing section 55 instructs the engine control apparatus 4 to decrease the upper limit engine speed of the engine 1 (step S8). In response to this instruction, the engine control apparatus 4 lowers the upper limit engine speed of the engine 1. This is carried out to prevent the counter electromotive force generated by the motor 2 coupled to the engine 1 from going high and exceeding the allowable voltage for the power drive unit 7 or the like when the engine 1 runs at a high speed with the control on the motor 2 stopped. As the counter electromotive force generated by the motor 2 rises in proportion to the number of rotations of the motor 2, the engine control apparatus 4 sets the upper limit engine speed of the engine 1 lower than the one at the normal time in such a way that the counter electromotive force generated by the motor 2 does not become higher than the allowable voltage for units or sensors connected closer to the battery 3 than to the motor 2. When the engine speed of the engine 1 reaches the set upper limit engine speed, the engine control apparatus 4 stops fuel injection so as to prevent the speed of the engine 1 from exceeding the upper limit engine speed.

According to this embodiment, when the control loop is checked for any abnormality and occurrence of an abnormality is detected, the motor 2 is not controlled by the control loop where the abnormality has occurred, thus making it possible to suppress a change in the behavior of a vehicle that does not meet a driver's demand. Further, control on the motor 2 is continued with some restriction put to the control within a predetermined time since the occurrence of an abnormality and is returned to the normal feedback control when the control loop returns to normal after the predetermined time elapses. Even if an abnormality occurs in the output value of each sensor for a short period of time due to noise or the like, therefore, it is possible to execute restricted control only for the time during which this abnormality is present. Further, after the predetermined time passes without the control returning to the normal state, it is determined that the sensor in question has failed and the motor control is completely stopped. This can prevent the motor control from continuing under the restricted condition.

What is claimed is:

1. A motor control apparatus for a hybrid vehicle with an engine for outputting driving force of the vehicle, a motor for generating driving force for assisting the output from said engine, a battery for supplying power to said motor and for storing electric energy regenerated by said motor acting as a generator when said driving force is not required, and a power drive unit for setting said supplied power to said motor or supplied current to said motor in accordance with a power instruction value or a current instruction value, comprising:

a detector for detecting said supplied power to said motor or said supplied current to said motor;

a feedback controller for performing feedback control to keep said supplied power or said supplied current at a target value based on the detection result from said detector, and for computing said power instruction value or said current instruction value supplied to said power drive unit;

an abnormality detector for detecting an abnormality in said detector; and an abnormality processing device for instructing said feedback controller to fix said supplied power or said supplied current to said motor to a predetermined value by reducing a gain in said feedback control or stopping said feedback control until a predetermined time elapses since detection of said abnormality in said detector, and to stop controlling said motor after said predetermined time elapses since detection of said abnormality.

2. The motor control apparatus according to claim 1, wherein said abnormality processing device restricts a speed of said engine in such a way that a counter electromotive force generated by said motor when control on said motor is stopped does not exceed a preset value.

3. The motor control apparatus according to claim 1, wherein said detector includes sensors, provided on both battery and motor terminals, for detecting said supplied power or said supplied current; and said abnormality detector detects said abnormality based on a difference between output values of said sensors.

4. The motor control apparatus according to claim 1, wherein said abnormality detector detects said abnormality by checking if an output value of said detector has become greater than a predetermined upper value or smaller than a predetermined lower value.

* * * * *